(12) United States Patent
Ohashi et al.

(10) Patent No.: US 9,821,622 B2
(45) Date of Patent: Nov. 21, 2017

(54) VEHICLE-HEIGHT ADJUSTING SYSTEM

(71) Applicant: TOYOTA JIDOSHA KABUSHIKI KAISHA, Toyota-shi, Aichi-ken (JP)

(72) Inventors: Hideki Ohashi, Chiryu (JP); Kohtaroh Okimura, Nissin (JP); Ryo Kanda, Nissin (JP); Shogo Tanaka, Toyota (JP); Jun Tokumitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/337,295

(22) Filed: Oct. 28, 2016

(65) Prior Publication Data

US 2017/0182857 A1 Jun. 29, 2017

(30) Foreign Application Priority Data

Dec. 28, 2015 (JP) ................................ 2015-255963

(51) Int. Cl.
*B60G 9/04* (2006.01)
*B60G 17/033* (2006.01)
(Continued)

(52) U.S. Cl.
CPC ............ *B60G 17/033* (2013.01); *B60G 11/27* (2013.01); *B60G 11/30* (2013.01); *B60G 17/0565* (2013.01); *B60G 2400/252* (2013.01); *B60G 2400/50* (2013.01); *B60G 2400/51* (2013.01); *B60G 2400/70* (2013.01); *B60G 2400/952* (2013.01); *B60G 2500/2021* (2013.01); *B60G 2500/30* (2013.01)

(58) Field of Classification Search
CPC .. B60G 11/27; B60G 17/052; B60G 17/0521; B60G 17/0523; B60G 2500/30; B60G 2202/412; B60G 2400/252; B60G 2500/20; B60G 2500/2021; B60G 2202/152

USPC ...... 280/124.157, 124.158, 124.159, 124.16, 280/124.161

See application file for complete search history.

(56) References Cited

U.S. PATENT DOCUMENTS 5,062,659 A * 11/1991 Edahiro ............... B60G 17/015
188/266.5
5,083,811 A * 1/1992 Sato ..................... B60G 17/018
280/124.16

(Continued)

FOREIGN PATENT DOCUMENTS

JP H03-70615 A 3/1991

*Primary Examiner* — Toan To
(74) *Attorney, Agent, or Firm* — Oliff PLC

(57) ABSTRACT

A vehicle-height adjusting system includes: vehicle-height adjusting actuators each for adjusting a vehicle height for a corresponding one of wheels; a pressure medium supplier for supplying a pressure medium from a tank to each of the vehicle-height adjusting actuators; and a vehicle height adjuster for adjusting the vehicle height for each wheel. The vehicle-height adjusting actuators include a left vehicle-height adjusting actuator and a right vehicle-height adjusting actuator. The vehicle height adjuster includes a supply amount controller configured to control the pressure medium supplier such that substantially the same amount of the pressure medium is to be supplied from the tank to the left vehicle-height adjusting actuator and the right vehicle-height adjusting actuator, when at least one of the wheels is in contact with an uneven road surface.

7 Claims, 7 Drawing Sheets

(51) Int. Cl.
  *B60G 11/27* (2006.01)
  *B60G 11/30* (2006.01)
  *B60G 17/056* (2006.01)

(56) References Cited

U.S. PATENT DOCUMENTS

| | | | | |
|---|---|---|---|---|
| 5,344,189 | A * | 9/1994 | Tanaka | B60G 17/017 280/124.159 |
| 6,202,010 | B1 * | 3/2001 | Shono | B60G 17/017 180/41 |
| 6,240,348 | B1 * | 5/2001 | Shono | B60G 17/017 280/124.159 |
| 6,983,201 | B2 * | 1/2006 | Misawa | B60G 17/0525 280/5.5 |
| 8,960,697 | B2 * | 2/2015 | Kato | B60G 13/08 280/124.157 |
| 2005/0093265 | A1 * | 5/2005 | Niaura | B60G 15/14 280/124.16 |
| 2006/0055129 | A1 * | 3/2006 | Amano | B60G 17/015 280/5.507 |
| 2006/0192361 | A1 * | 8/2006 | Anderson | B60G 17/0195 280/124.158 |
| 2007/0040344 | A1 * | 2/2007 | Stiller | B60G 17/0523 280/124.157 |
| 2008/0111337 | A1 * | 5/2008 | Suzuki | B60G 11/27 280/124.157 |
| 2016/0272035 | A1 * | 9/2016 | Oishi | B60G 17/0525 |

* cited by examiner

VEHICLE-HEIGHT ADJUSTING SYSTEM

CROSS REFERENCE TO RELATED APPLICATION

The present application claims priority from Japanese Patent Application No. 2015-255963, which was filed on Dec. 28, 2015, the disclosure of which is herein incorporated by reference in its entirety.

BACKGROUND

Technical Field

The following disclosure relates to a vehicle-height adjusting system configured to adjust a vehicle height using a pressure medium.

Description of the Related Art

Patent Document 1 (Japanese Patent Application Publication No. 3-70615) discloses a vehicle-height adjusting system configured to control supply and discharge of air to and from an air cylinder such that an actual vehicle height for a wheel as an actual vehicle height is brought closer to a target vehicle height.

SUMMARY

The object of the present disclosure relates to an improvement of a vehicle-height adjusting system, for example, to a technique of allowing a vehicle to pass through an uneven road well and reducing an inclination of the vehicle having returned to an even road.

The vehicle-height adjusting system according to the present disclosure comprises: a left vehicle-height adjusting actuator corresponding to at least one left wheel on at least one of a front-wheel side and a rear-wheel side; and a right vehicle-height adjusting actuator corresponding to at least one right wheel on the at least one of the front-wheel side and the rear-wheel side. In the case of an uneven road, substantially the same amount of pressure medium is to be supplied to the left vehicle-height adjusting actuator and the right vehicle-height adjusting actuator. Increase in vehicle height allows a vehicle passes through an uneven road well. Also, since substantially the same amount of pressure medium is to be supplied to the left vehicle-height adjusting actuator and the right vehicle-height adjusting actuator, it is possible to reduce inclination of a vehicle body in a right and left direction (i.e., a widthwise direction of the vehicle) when the vehicle has reached the even road after passing through the uneven road.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described a vehicle-height adjusting system according to one embodiment by reference to the drawings. The present vehicle-height adjusting system utilizes air as a pressure medium.

Figure 1:
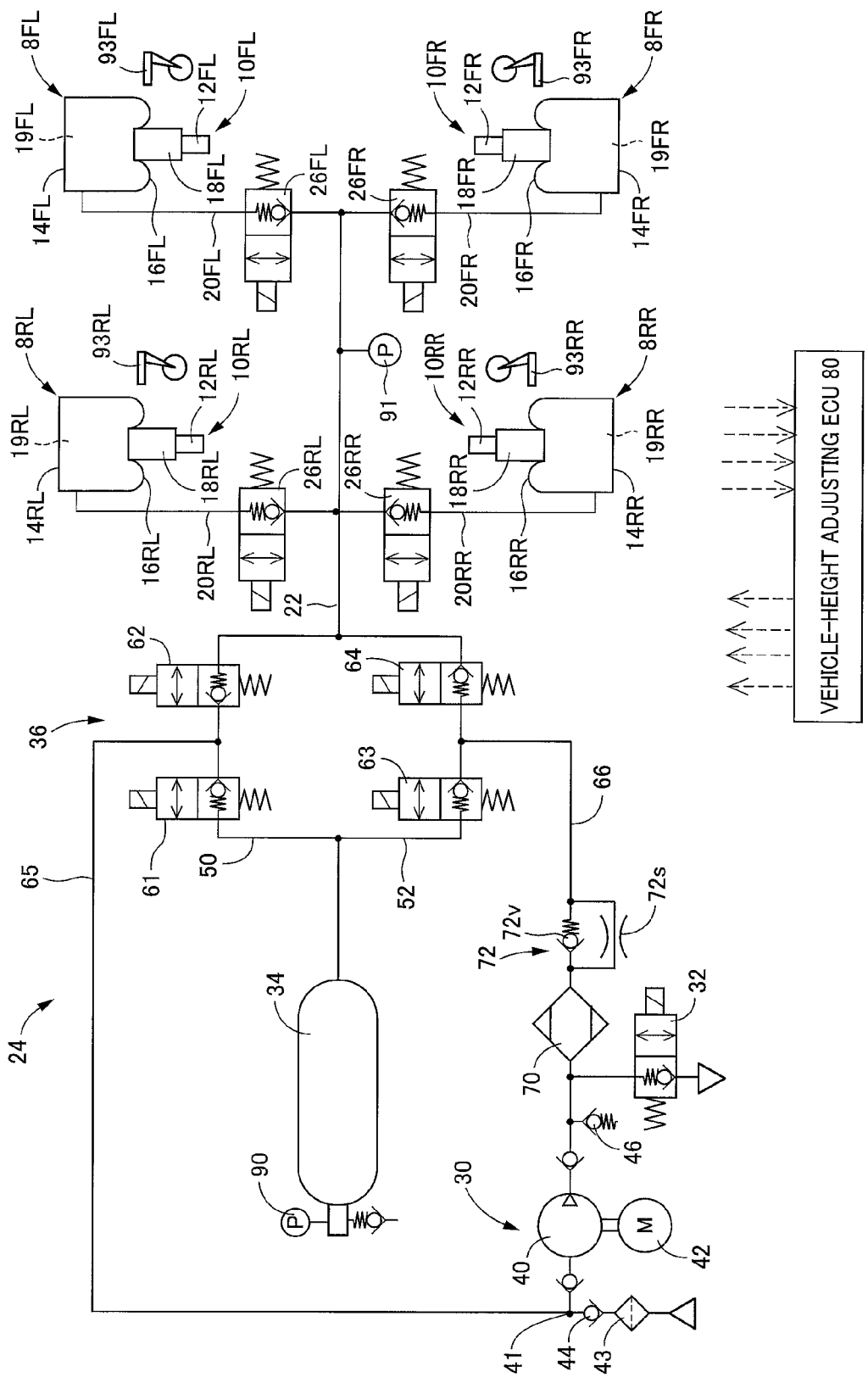
FIG. 1 is a circuit diagram of a vehicle-height adjusting system according to one embodiment.
Figure 5:
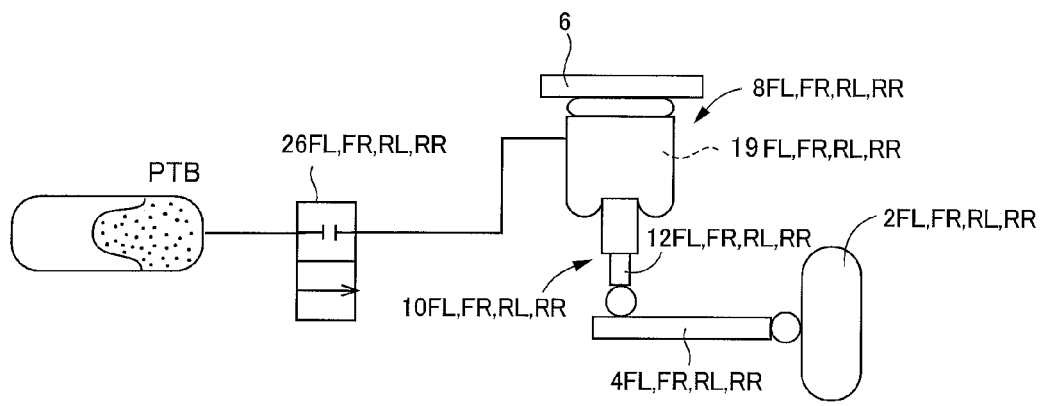
FIG. 5 is a view of the vehicle-height adjusting system, schematically illustrating a state in which air is supplied from a tank to an air cylinder.
Figure 5:
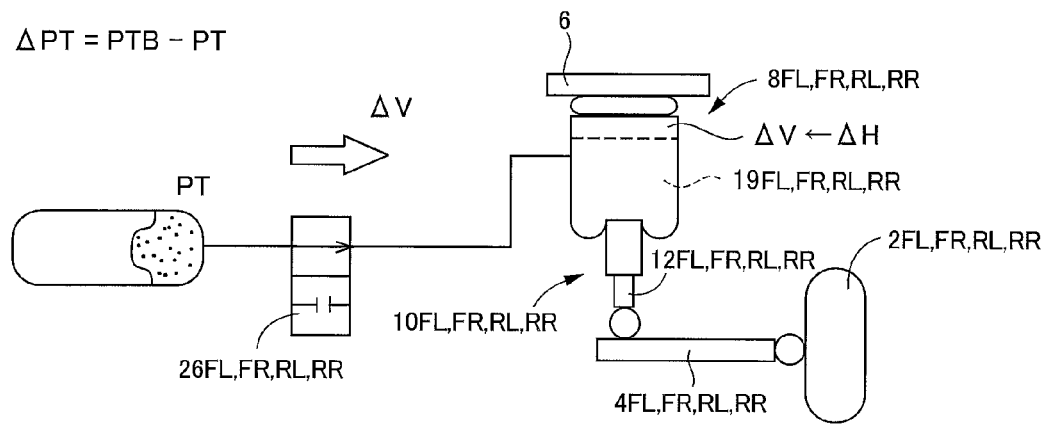

In this vehicle-height adjusting system, as illustrated in FIGS. 1 and 5, suspension arms 4FL, 4FR, 4RL, 4RR as wheel-side components are respectively coupled to a front left wheel 2FL, a front right wheel 2FR, a rear left wheel 2RL, and a rear right wheel 2RR provided on a vehicle. Air cylinders 8FL, 8FR, 8RL, 8RR as vehicle-height adjusting actuators and shock absorbers 10FL, 10FR, 10RL, 10RR are provided between a vehicle body 6 and the suspension respective arms 4FL, 4FR, 4RL, 4RR. In the following description, each of the air cylinders 8, the shock absorbers 10, and other similar components will be referred with a corresponding one of suffixes (FL, FR, RL, RR) indicative of the respective wheels 2 where the air cylinders 8 and the shock absorbers 10 should be distinguished by their respective wheel positions. On the other hand, where these devices are collectively referred, or the distinction is not required, each of the air cylinders 8, the shock absorbers 10, and the other similar components will be referred without such suffixes.

Each of the shock absorbers 10 includes: an absorber body 12 provided on the suspension arm 4; and an absorber piston, not illustrated, provided on the vehicle body 6. Each of the air cylinders 8 includes: a cylinder body 14 provided on the vehicle body 6; a diaphragm 16 fixed to the cylinder body 14; and an air piston 18 provided integrally with the diaphragm 16 and the absorber body 12 of the shock absorber 10 so as to be movable in the up and down direction. Interiors of the cylinder body 14, the diaphragm 16, and the air piston 18 serve as a chamber 19 as a pressure medium chamber. When air is supplied to or discharged from the chamber 19, the air piston 18 is moved relative to the cylinder body 14 in the up and down direction. This movement moves the absorber body 12 and the absorber piston relative to each other in the up and down direction in the shock absorber 10. As a result, a distance between the wheel 2 and the vehicle body 6 is changed, that is, a vehicle height is changed.

An air source device 24 is connected to the chambers 19 defined in the air cylinders 8, via respective individual passages 20 and a common passage 22. Individual vehicle-height adjusting valves (each hereinafter referred to as "vehicle-height adjusting valve") 26 are provided on the respective individual passages 20. Each of the vehicle-height adjusting valves 26 is a normally closed electromagnetic valve. When being in an open state, the vehicle-height adjusting valve 26 allows flow of air in opposite directions. When being in a closed state, the vehicle-height adjusting valve 26 prevents flow of air in a direction directed from the chamber 19 to the common passage 22 but allows flow of air in the direction directed from the common passage 22 to the chamber 19 when a pressure of air in the common passage 22 becomes higher than a pressure of air in the chamber 19 by a set pressure.

Figure 6:
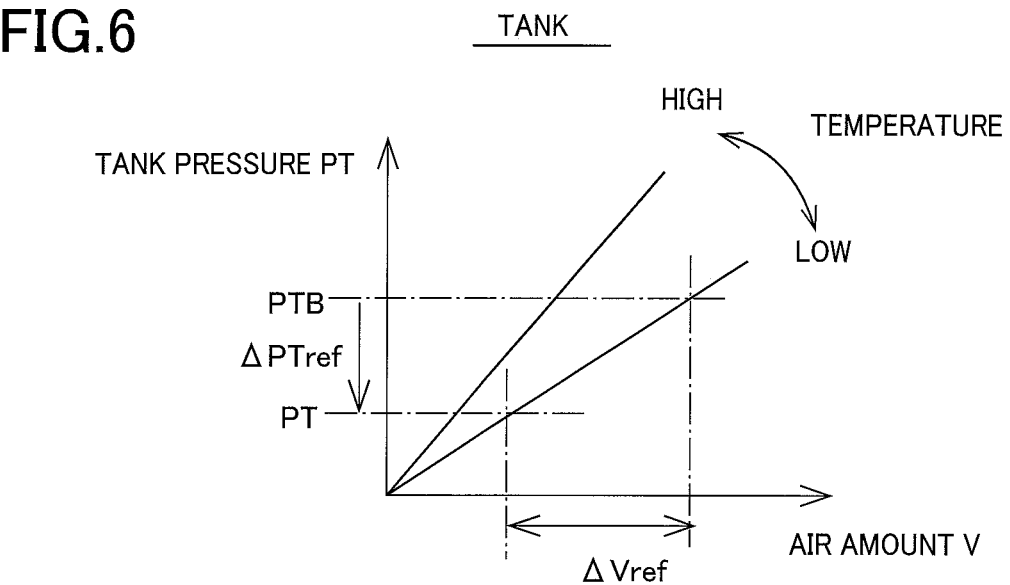
FIG. 6 is a view illustrating a relationship between an amount of air and a tank pressure in a tank in the vehicle-height adjusting system, and this relationship is stored in the storage of the vehicle-height adjusting ECU.

The air source device 24 includes a compressor device 30, an air-discharge valve 32, a tank 34, and a switching device 36. The compressor device 30 includes: a compressor 40; an electric motor 42 that drives the compressor 40; an air intake valve 44 that is a check valve provided between atmosphere (outside the vehicle-height adjusting system) and an intake-side portion 41 located on an air-intake-side of the compressor 40; and a relief valve 46 provided on an ejection side of the compressor 40. When a pressure of air in the intake-side portion 41 of the compressor 40 is lower than an atmospheric pressure, the compressor 40 sucks air from the atmosphere via a filter 43 and the air intake valve 44. When a discharge pressure of the compressor 40 has increased, air is discharged to the atmosphere via the relief valve 46. The tank 34 stores air in a pressurized state. When an amount of air stored in the tank 34 increases, a pressure of the air in the tank 34 (hereinafter may be referred to as "tank pressure") increases. A relationship illustrated in FIG. 6 is established between the tank pressure and the amount of air in the tank 34. It is noted that the relationship between the tank pressure and the amount of air in the tank 34 is a relationship represented by the straight line in FIG. 6 but may be a relationship represented by a curve, for example.

The switching device 36 is provided among the common passage 22, the tank 34, and the compressor device 30 to switch a direction in which air flows among them. As illustrated in FIG. 1, the common passage 22 and the tank 34 are connected to each other by a first passage 50 and a second passage 52 which are provided in parallel. Circuit valves 61, 62 are provided on the first passage 50 in series. Circuit valves 63, 64 are provided on the second passage 52 in series. A third passage 65 is connected to the first passage 50 at a position located between the two circuit valves 61, 62 and connected to a position located on an air-intake-side of the compressor 40. A fourth passage 66 is connected to the second passage 52 at a position located between the two circuit valves 63, 64 and connected to a position located on an ejection side of the compressor 40. Each of the circuit valves 61-64 is a normally closed valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

The air-discharge valve 32 is a normally closed electromagnetic valve provided on the fourth passage 66 at a position located on an ejection side of the compressor 40. When being in an open state, the air-discharge valve 32 allows discharge of air from the fourth passage 66 to the atmosphere. When being in a closed state, the air-discharge valve 32 prevents discharge of air from the fourth passage 66 to the atmosphere. It is noted that when a pressure of air in the fourth passage 66 becomes lower than the atmospheric pressure by a set pressure in the closed state of the air-discharge valve 32, the air-discharge valve 32 allows supply of air from the atmosphere to the fourth passage 66. A dryer 70 and a flow restricting mechanism 72 are provided in series on the fourth passage 66 at positions located nearer to the second passage 52 than the air-discharge valve 32. The flow restricting mechanism 72 includes a pressure differential valve 72*v* and a restrictor 72*s* provided in parallel. The pressure differential valve 72*v* prevents flow of air from a second-passage side to a compressor side. When a pressure on the compressor side becomes higher than that on the second-passage side by a set pressure, the pressure differential valve 72*v* allows flow of air from the compressor 40 to the second passage 52.

Figure 2:
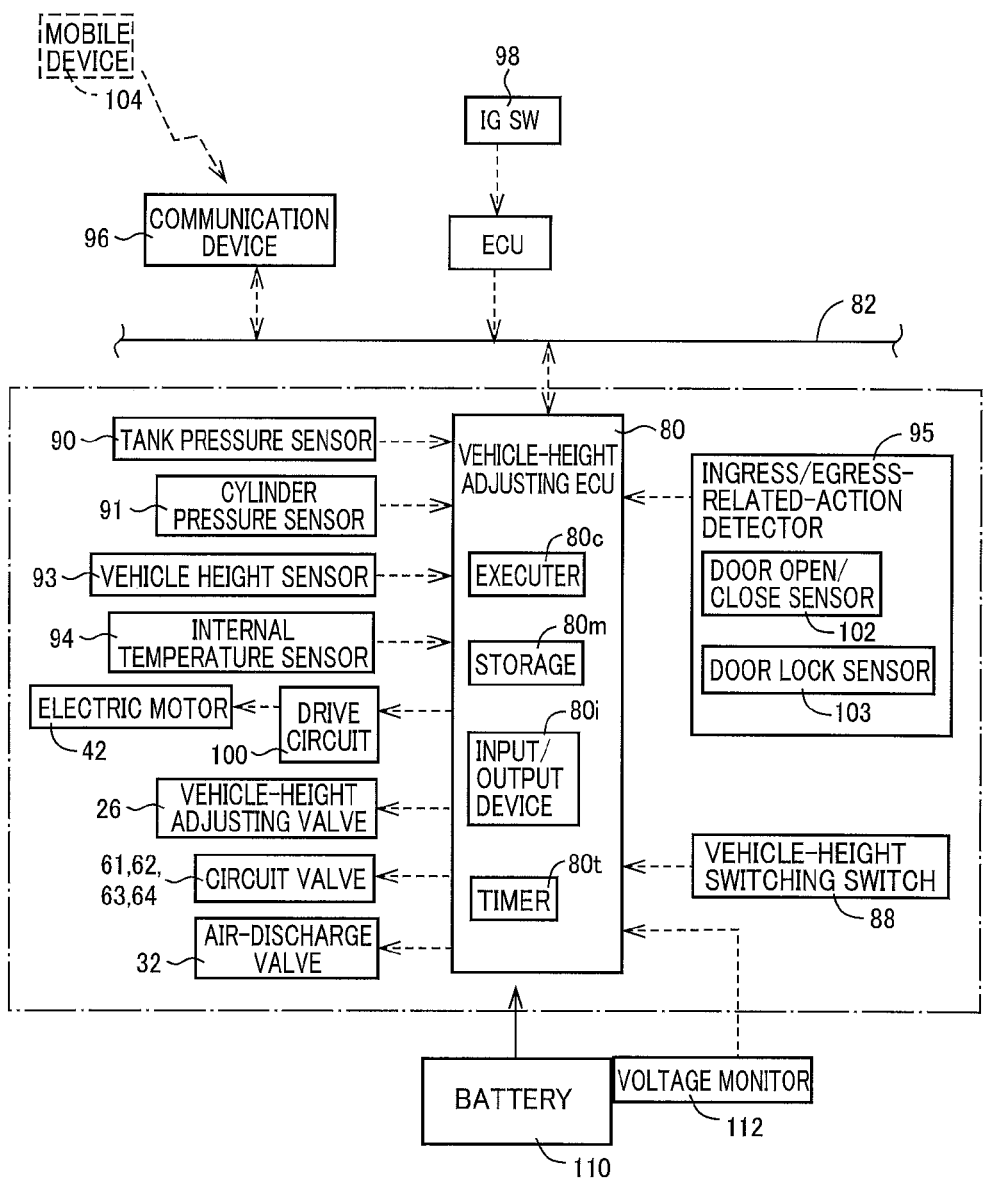
FIG. 2 is a conceptual view illustrating a vehicle-height adjusting ECU and devices connected thereto in the vehicle-height adjusting system.

In the present embodiment, the vehicle-height adjusting system is controlled by a vehicle-height adjusting electronic control unit (ECU) 80 mainly constituted by a computer. The vehicle-height adjusting ECU 80 is communicable with devices, such as an ECU, via a car area network (CAN) 82. As illustrated in FIG. 2, the vehicle-height adjusting ECU 80 includes an executer 80*c*, a storage 80*m*, an input/output device 80*i*, and a timer 80*t*. Devices connected to the input/output device 80*i* include a vehicle-height switching switch 88, a tank pressure sensor 90, a cylinder pressure sensor 91, vehicle height sensors 93, an internal temperature sensor 94, and ingress/egress-related-action detectors 95. Also, devices including a communication device 96 and an ignition switch 98 are connected to the input/output device 80*i* via the CAN 82. The electric motor 42 is connected to the input/output device 80*i* via a drive circuit 100. The air-discharge valve 32, the vehicle-height adjusting valves 26, and the circuit valves 61-64 are connected to the input/output device 80*i*.

A driver operates the vehicle-height switching switch 88 to instruct a change of the vehicle height to one of "L" (Low), "N" (Normal), and "H" (High). The tank pressure sensor 90 detects the tank pressure. The cylinder pressure sensor 91 is provided on the common passage 22. When any of the vehicle-height adjusting valves 26 is open, the cylinder pressure sensor 91 detects a pressure of air in the chamber 19 defined in the air cylinder 8 corresponding to the open vehicle-height adjusting valve 26 (the wheel). When all the vehicle-height adjusting valves 26 are closed, the cylinder pressure sensor 91 detects a pressure of the air in the common passage 22. The vehicle height sensors 93 are provided for the respective wheels 2FL, 2FR, 2RL, 2RR. Each of the vehicle height sensors 93 detects the height of the vehicle body 6 relative to a corresponding one of the wheels 2. The internal temperature sensor 94 detects a temperature in the vehicle-height adjusting system which is estimated to correspond to a temperature of air stored in the tank 34. The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96. In the present embodiment, the vehicle-height adjusting system is operable by electric power provided from a battery 110. The voltage of the battery 110 is detected by a voltage monitor 112 that is connected to the vehicle-height adjusting ECU 80.

Figure 3A:
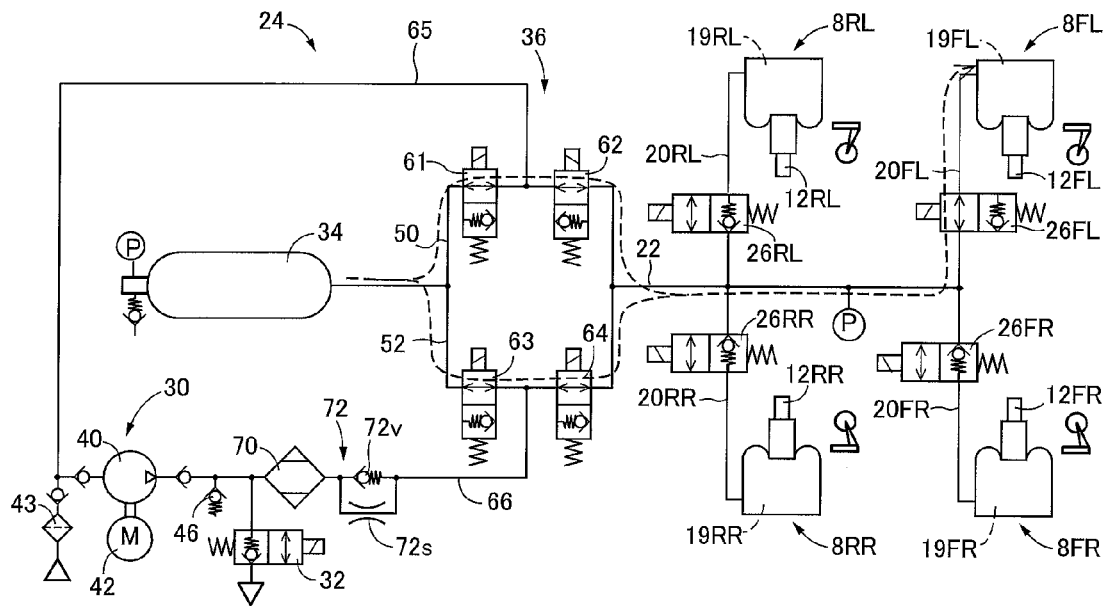
FIG. 3A is a view of the vehicle-height adjusting system, illustrating a state in the case where a vehicle height is increased.
Figure 3B:
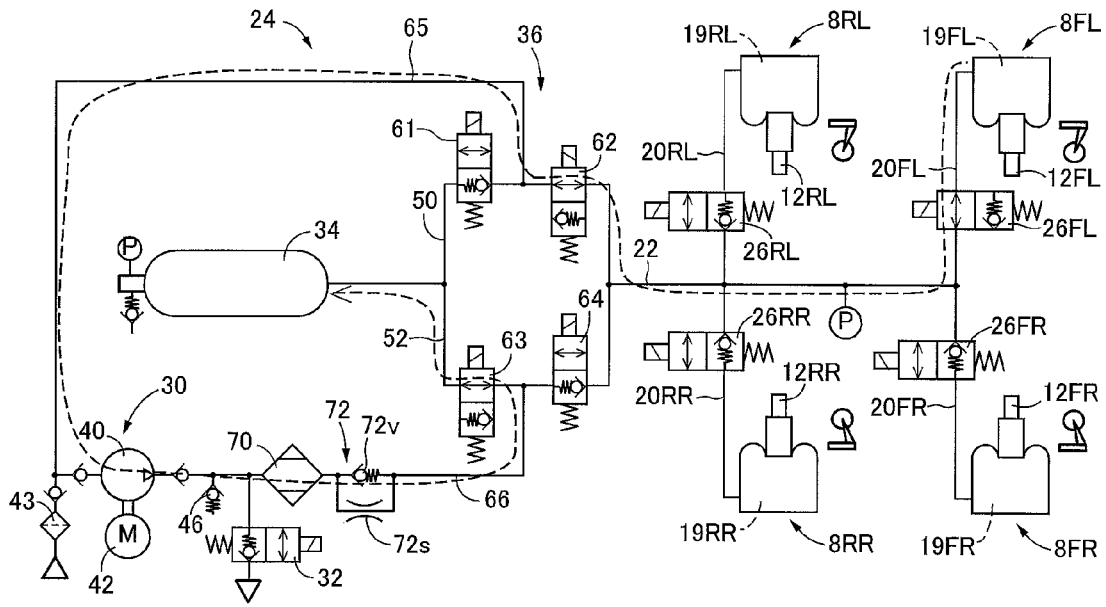
FIG. 3B is a view of the vehicle-height adjusting system, illustrating a state in the case where the vehicle height is reduced.

In the vehicle-height adjusting system configured as described above, for example, in the case where the vehicle height for a control target wheel (the front left wheel 2FL in FIGS. 3A and 3B) is to be increased (noted that this control may be hereinafter referred to as "up control"), as illustrated in FIG. 3A, the circuit valves 61-64 are opened, and the vehicle-height adjusting valve 26FL corresponding to the control target wheel is opened in a state in which the compressor 40 is stopped. The air stored in the tank 34 is supplied to the chamber 19 defined in the air cylinder 8FL provided for the control target wheel 2FL. As a result, the vehicle height for the control target wheel 2FL is increased. In the case where the vehicle height is to be reduced (noted that this control may be hereinafter referred to as "down control"), as illustrated in FIG. 3B, the electric motor 42 is driven to actuate the compressor 40, the circuit valves 61, 64 are closed, the circuit valves 62, 63 are opened, and the vehicle-height adjusting valve 26FL corresponding to the control target wheel 2FL is opened. Air is discharged from the chamber 19 defined in the air cylinder 8FL provided for the control target wheel 2FL and is supplied to the tank 34. In the present embodiment, a target value of an amount of increase in the vehicle height is determined as a target vehicle-height increase amount $\Delta$Href. To achieve this target vehicle-height increase amount $\Delta$Href, an amount of air supplied from the tank 34 to the air cylinder 8 (a supply amount $\Delta$V) is controlled. This supply amount $\Delta$V is controlled based on a tank pressure PT.

As described above, as illustrated in FIG. 6, the tank pressure increases with increase in the amount of air stored in the tank 34. Thus, as illustrated in FIG. 5, when air is supplied from the tank 34 to the air cylinder 8, the amount of air stored in the tank 34 is reduced, thereby lowering the tank pressure. Also, as illustrated in FIG. 6, the tank pressure is higher relative to the amount of air stored in the tank 34 in the case where the temperature of the air stored in the tank 34 is high than in the case where the temperature of the air stored in the tank 34 is low.

Figure 7:
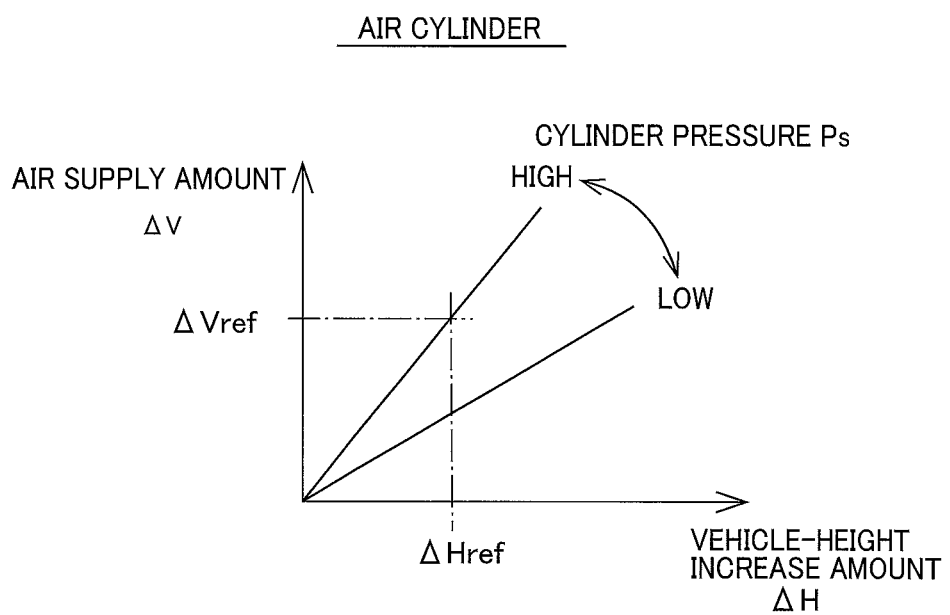
FIG. 7 is a view illustrating a relationship between an amount of increase in air and an amount of increase in the vehicle height in the air cylinder in the vehicle-height adjusting system, and this relationship is stored in the storage of the vehicle-height adjusting ECU.

In the air cylinder 8, as illustrated in FIG. 7, an increase amount $\Delta$H of the vehicle height increases with increase in amount of air supplied to the chamber 19, i.e., amount of increase in air in the chamber 19. In this case, a larger air supply amount is required to increase the same amount of the vehicle height in the case where a pressure of air in the chamber 19 as a cylinder pressure Ps is high than in the case where a pressure of air in the chamber 19 as a cylinder pressure Ps is low. It is noted that the relationship in FIG. 7 is usually different between (i) the air cylinders 8FR, 8FL provided for the front wheels and (ii) the air cylinders 8RR, 8RL provided for the rear wheels. In the present embodiment, a relationship for the air cylinders 8FR, 8FL provided for the front wheels and a relationship for the air cylinders 8RR, 8RL provided for the rear wheels are stored independently of each other.

An amount of air to be supplied to the chamber 19 is determined as a target air supply amount $\Delta$Vref based on the target vehicle-height increase amount $\Delta$Href and the relationship illustrated in FIG. 7. An amount of reduction in the tank pressure in the case where the target air supply amount $\Delta$Vref of air is discharged from the tank 34 is determined as a target tank-pressure reduction amount $\Delta$PTref based on the target air supply amount $\Delta$Vref and the relationship illustrated in FIG. 6. In other words, when the vehicle-height adjusting valves 26 and other devices are controlled such that an actual reduction amount $\Delta$PT of the tank pressure PT becomes equal to the target tank-pressure reduction amount $\Delta$PTref, the target air supply amount $\Delta$Vref of air is supplied from the tank 34 to the air cylinder 8 to increase the vehicle height by the target vehicle-height increase amount $\Delta$Href. That is, the increase amount $\Delta$H of the vehicle height is controlled by controlling the tank pressure PT or the reduction amount $\Delta$PT of the tank pressure. The cylinder pressure Ps and/or a temperature of air (i.e., an internal temperature) T may be took into consideration to accurately control the increase amount of the vehicle height.

A warp amount Wp is an absolute value of a difference between the sum of the respective vehicle heights for one pair of the diagonally opposite wheels 2 (2FL, 2RR) and the sum of the respective vehicle heights for the other pair of the diagonally opposite wheels 2 (2FR, 2RL). It is noted that an average value may be used instead of the sum. The warp amount Wp is large in the case where a road surface with which the wheel 2 is in contact is uneven (hereinafter may be hereinafter referred to simply as "uneven road"). Thus, when the warp amount Wp is larger than a threshold value Wth, it is possible to determine that the wheel 2 is in contact with the uneven road.

$$Wp=|(HFL+HRR)-(HFR+HRL)|>Wth$$

In the case of the uneven road, the target vehicle-height increase amount $\Delta$Href is determined based on the warp amount Wp, and this target vehicle-height increase amount $\Delta$Href is the same for all the four wheels 2FL, 2FR, 2RL, 2RR. For example, the target vehicle-height increase amount $\Delta$Href may be a value that is larger in the case where the warp amount Wp is large than in the case where the warp amount Wp is small. The target air supply amounts $\Delta$Vref for the respective air cylinders 8FL, 8FR, 8RL, 8RR are determined so as to achieve the target vehicle-height increase amount $\Delta$Href, and the target tank-pressure reduction amounts $\Delta$PTref for the respective wheels 2FL, 2FR, 2RL, 2RR are determined. However, since the air cylinders 8 are different in size between the front wheels and the rear wheels, for example, the relationships in FIG. 7 are in most cases different between the front wheels and the rear wheels, so that the target air supply amounts $\Delta$Vref are also different between the front wheels and the rear wheels. However, the air cylinders 8 provided for the respective wheels 2FL, 2FR are identical in size and other parameters, and likewise the air cylinders 8 provided for the respective wheels 2RL, 2RR are identical in size and other parameters. Thus, in the case where the temperature of the air and a load applied to the wheel, and so on are the same, the same relationship in FIG. 7 is established. Accordingly, substantially the same target air supply amount $\Delta$Vref is determined. That is, the target air supply amount $\Delta$Vref for the wheel 2FL is equal to the target air supply amount $\Delta$Vref for the wheel 2FR, and the target air supply amount $\Delta$Vref for the wheel 2RL is equal to the target air supply amount $\Delta$Vref for the wheel 2RR.

In the case of the uneven road, on the other hand, the vehicle heights are usually different between the wheels 2FL, 2FR, and likewise the vehicle heights are usually different between the wheels 2RL, 2RR. Even in the case where the vehicle height for the front left wheel 2FL is higher than a normal vehicle height, and the vehicle height for the front right wheel 2FR is lower than the normal vehicle height, for example, the same target vehicle-height increase amount ΔHref is used for the front left wheel 2FL and the front right wheel 2FR in the present embodiment. Thus, substantially the same amount of air is supplied to the air cylinders 8FL, 8FR.

Figure 4:
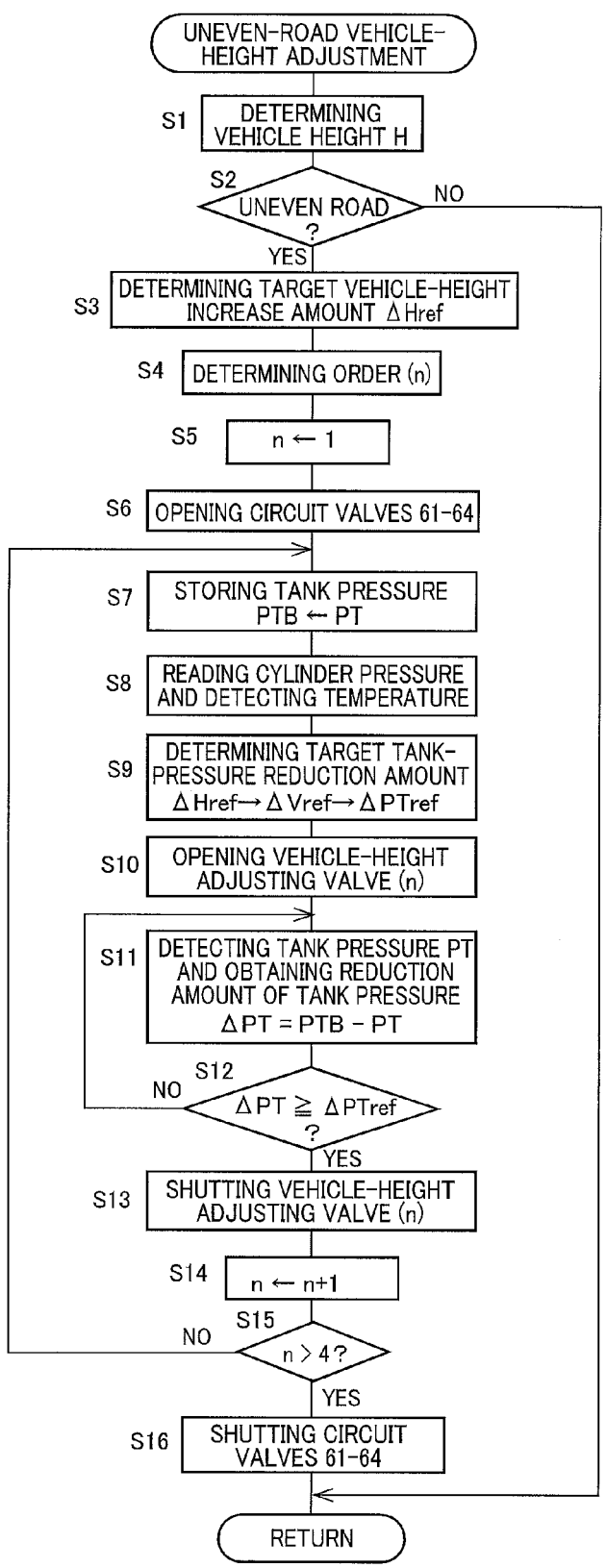
FIG. 4 is a flow chart illustrating an uneven-road vehicle-height adjusting program stored in a storage of the vehicle-height adjusting ECU.

An uneven-road vehicle-height adjusting program illustrated in the flow chart in FIG. 4 is executed every time a predetermined set length of time is elapsed. This flow begins with S1 at which vehicle heights HFL, HFR, HRL, HRR for the respective wheels 2FL, 2FR, 2RL, 2RR are detected. At S2, the warp amount Wp is obtained, and it is determined whether the warp amount Wp is larger than the threshold value Wth. That is, it is determined whether the vehicle is traveling on the uneven road. In the case of the uneven road, the target vehicle-height increase amount ΔHref is at S3 determined based on the warp amount Wp and so on. At S4, an order of execution of the vehicle height adjustment is determined. For example, adjustment of the vehicle heights may be executed in order from the wheel 2 for which the vehicle height is the lowest among the wheels 2FL, 2FR, 2RL, 2RR. In the case where the vehicle heights are increased in order from the wheel 2 for which the vehicle height is the lowest, the driver feels safe early to travel on the uneven road. Furthermore, increasing the vehicle height of the wheel 2 for which the vehicle height is the lowest increases a possibility that the vehicle easily passes through the uneven road. However, it is not essential to adjust the vehicle heights in the order from the wheel 2 for which the vehicle height is the lowest. For example, a predetermined order may be used in the order of the front right wheel, the front left wheel, the rear right wheel, and the rear left wheel. It is noted that a value n represents an ordinal number of the adjustment of the vehicle height for one of the wheels 2.

At S5, the first wheel 2 (n=1) is determined as a control target wheel. In this example, it is assumed that the front right wheel 2FR is assigned with the first ordinal number (n=1). At S6, all the four circuit valves 61-64 are opened. At S7, the current tank pressure PT is detected and stored as a reference tank pressure PTB. At S8, the internal temperature sensor 94 detects the internal temperature, and the cylinder pressure Ps in the air cylinder 8FR corresponding to the control target wheel 2FR is read, which cylinder pressure Ps is detected and stored in the preceding vehicle height adjustment. The detected cylinder pressure Ps is stored. In the present embodiment, the cylinder pressure sensor 91 detects a pressure of air in the air cylinder 8FR just before the completion of the adjustment of the vehicle height (noted that this air cylinder 8FR corresponds to the open vehicle-height adjusting valve 26FR). The detected pressure is stored as the cylinder pressure Ps and read. At S9, the relationship in FIG. 6 between the tank pressure and the amount of air stored in the tank 34 is determined based on a temperature T, and the relationship in FIG. 7 between the vehicle-height increase amount and the amount of air supplied to the chamber 19 is determined based on the cylinder pressure Ps. The target air supply amount ΔVref is determined based on these relationships and the target vehicle-height increase amount ΔHref, and the target tank-pressure reduction amount ΔPTref is determined.

At S10, the vehicle-height adjusting valve 26FR corresponding to the control target wheel 2FR is opened. In this case, since the vehicle-height adjusting valves 26FL, 26RL, 26RR are closed, the air stored in the tank 34 is supplied only to the air cylinder 8FR. At S11, the tank pressure PT is detected, and the reduction amount ΔPT of the actual tank pressure which is obtained by subtracting the current tank pressure PT from the reference tank pressure PTB is determined. At S12, it is determined whether the reduction amount ΔPT of the actual tank pressure has reached the target tank-pressure reduction amount ΔPTref. The processings at S11 and S12 are repeated to supply air from the tank 34 to the air cylinder 8FR before the reduction amount ΔPT of the actual tank pressure reaches the target tank-pressure reduction amount ΔPTref. When the reduction amount ΔPT of the actual tank pressure has reached the target tank-pressure reduction amount ΔPTref, the vehicle-height adjusting valve 26FR is closed at S13. With these processings, the target air supply amount ΔVref of air is supplied to the air cylinder 8FR.

At S14, the value n representing the ordinal number is incremented by one (n=2). At S15, it is determined whether the value n is larger than four. When the value n is smaller than or equal to four, a negative decision (NO) is made, and this flow returns to S7 at which the tank pressure PT is detected and determined as the reference tank pressure PTB. The processing at S7 may be configured such that when the processing at S7 is executed for the first time, the tank pressure is detected, and the detected tank pressure is determined as the reference tank pressure PTB, and when the processing at S7 is executed for the second and subsequent times, the tank pressure detected at the preceding processing at S11 is determined as the reference tank pressure PTB.

Thereafter, the adjustment of the vehicle height is executed for the second control target wheel 2 (n=2) in a similar manner. In this example, it is assumed that the rear left wheel 2RL is assigned with the second ordinal number (n=2). The target tank-pressure reduction amount ΔPTref is determined, the vehicle-height adjusting valves 26FR, 26FL, 26RR are closed, and the vehicle-height adjusting valve 26RL is opened. Air is then supplied to the air cylinder 8RL. When the reduction amount ΔPT of the actual tank pressure (PTB−PT) has reached the target tank-pressure reduction amount ΔPTref, the vehicle-height adjusting valve 26RL is closed. The value n is incremented by one (n=3). The negative decision (NO) is made at S15, and the flow returns to S7. When the adjustment of the vehicle height has been executed for all the four wheels 2, and the target air supply amounts ΔVref of air are supplied to the respective air cylinders 8, a positive decision (YES) is made at S15, and the circuit valves 61-64 are closed at S16.

Figure 8:
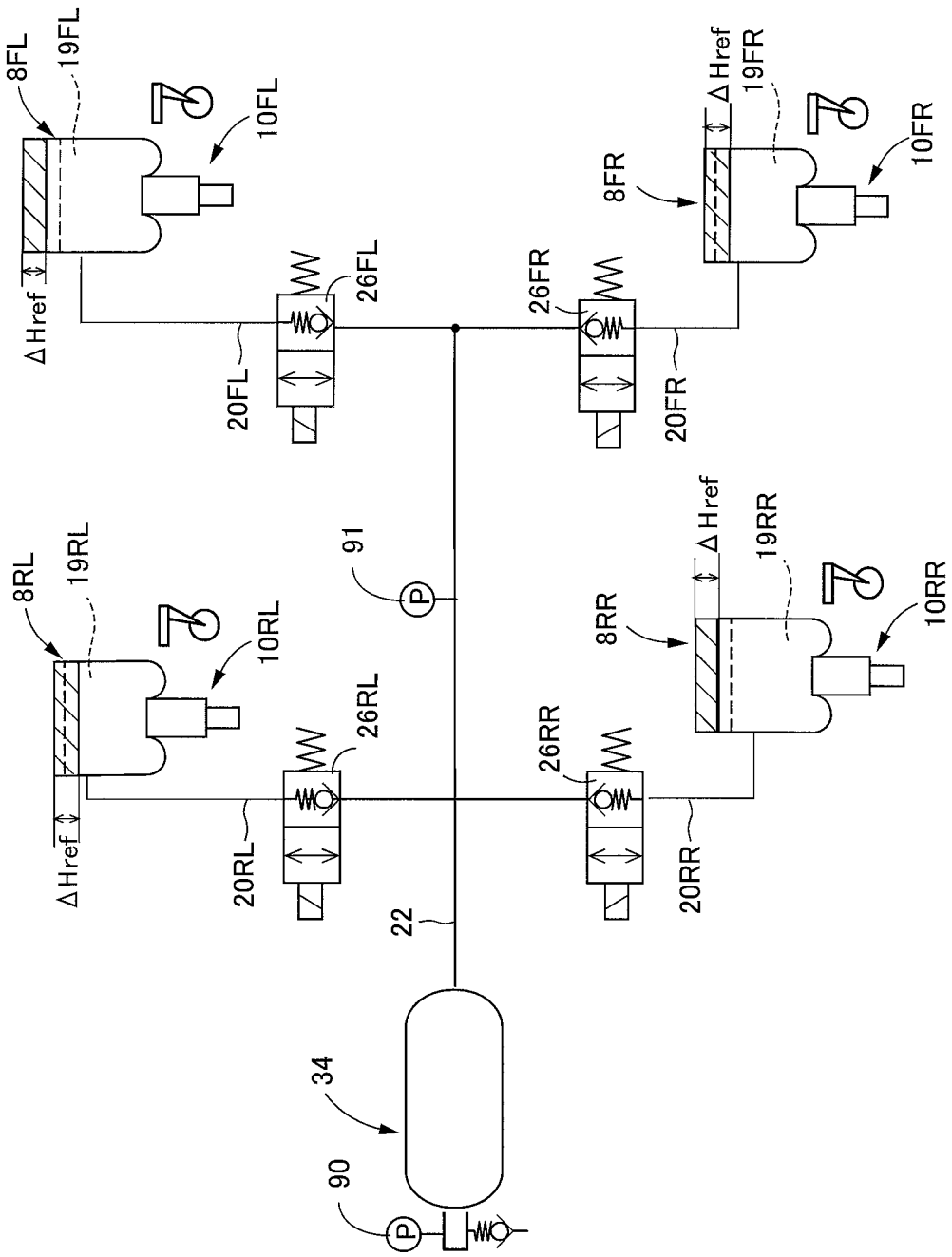
FIG. 8 is a view of the vehicle-height adjusting system, schematically illustrating a state in the case where the uneven-road vehicle-height adjusting program is executed.

In the vehicle-height adjusting system as described above, as illustrated in FIG. 8, air is supplied to the air cylinders 8 provided for the respective four wheels 2 such that their respective vehicle heights are increased by the same amount. This configuration allows the vehicle to satisfactorily pass through the uneven road and well reduces inclination of a body of the vehicle in the right and left direction when the vehicle has reached an even road. If the adjustment of the vehicle height is executed on the uneven road such that the vehicle body is made substantially horizontal, the vehicle body may be unfortunately inclined when the vehicle has reached the even road. In the present embodiment, however, the above-described processings are executed so as to achieve the same vehicle-height increase amount for the right and left wheels 2. This configuration well reduces the inclination of the vehicle body in the right and left direction when the vehicle has reached the even road. In the case where the tank 34 and a plurality of the air cylinders 8 communicate with each other, a large amount of air is supplied to the air cylinder having a low cylinder pressure Ps, and a small amount of air is supplied to the air cylinder having a high cylinder pressure Ps. This makes it difficult to supply the same amount of air to the air cylinders 8. In contrast, substantially the same amount of air can be supplied to all the air cylinders 8 in the case where the tank 34 communicates with each of the air cylinders 8 and in the case where the air cylinder 8 is isolated from the tank 34 when the reduction amount ΔPT of the actual tank pressure has reached the target tank-pressure reduction amount ΔPTref. This configuration well reduces the inclination of the vehicle body when the vehicle passes through the uneven road and has reached the even road. Also, in the present embodiment, air stored in the tank 34 is supplied to the air cylinders 8 via the first passage 50 and the second passage 52. In other words, the air is supplied without via the compressor 40. This configuration reduces the need of consideration of an amount of air in a crank chamber defined in the compressor 40, making it possible to control the amount of supplied air more accurately.

It is noted that, in the present embodiment, the temperature of the air and the cylinder pressure Ps are took into consideration for determination of the target tank-pressure reduction amount ΔPref, but it is not essential to take the temperature of the air and the cylinder pressure Ps into consideration. For example, each of the relationship between the tank pressure in the tank 34 and the amount of air stored in the tank 34 and the relationship between the vehicle-height change amount and the amount of supply and discharge of air to and from the air cylinder 8 may be made constant.

Furthermore, application of the adjustment of the vehicle height based on the tank pressure PT is not limited to the uneven road. A target value ΔVref of the amount of supply and discharge of air is determined based on the relationship illustrated in FIG. 7 and the target vehicle-height increase amount ΔHref. A target value ΔPTref of an amount of change in the tank pressure PT is determined based on the target value ΔVref of the amount of supply and discharge of air and the relationship illustrated in FIG. 6. For example, the present control may be applied to the case where an automatic leveling control is executed and the case where the vehicle-height switching switch 88 is operated, for example.

Furthermore, in the case where the vehicle-height switching switch 88 is operated on the uneven road, a higher priority may be given to this operation to adjust the vehicle height. When the vehicle-height switching switch 88 is operated to reduce the vehicle height, it is possible to reduce the vehicle height even in the case of the uneven road. In the case where the vehicle-height switching switch 88 is operated to increase the vehicle height, the target vehicle-height increase amount ΔHref may be determined based on the vehicle height instructed by the vehicle-height switching switch 88. Furthermore, the adjustment of the vehicle height based on the tank pressure may also be applied to the case where the vehicle height is reduced. Furthermore, it is not essential to control the amount of air to be supplied, so as to provide the same vehicle-height increase amount for all the front left and right and rear left and right wheels. For example, the amount of air to be supplied may be controlled so as to provide the same vehicle-height increase amount for at least the front left and right wheels or the rear left and right wheels.

In view of the above, in the present embodiment, each of a pressure-medium supplying and discharging device and a pressure medium supplier is constituted by the air source device 24, the vehicle-height adjusting valves 26, and other elements, for example. A vehicle height adjuster is constituted by the tank pressure sensor 90 and portions of the vehicle-height adjusting ECU 80 which store and execute the uneven-road vehicle-height adjusting program, for example. A supply amount controller is constituted by portions of the vehicle-height adjusting ECU 80 which store and execute the processings at S9-S12. An individual controller is constituted by portions of the vehicle-height adjusting ECU 80 which store and execute the processings at S10-S12. A tank-pressure-dependent vehicle height adjuster and a tank-pressure-dependent controller are constituted by portions of the vehicle-height adjusting ECU 80 which store and execute the processings at S7, S9, S11, and S12.

It is to be understood that the disclosure is not limited to the details of the illustrated embodiment, but may be embodied with various changes and modifications, which may occur to those skilled in the art, without departing from the spirit and scope of the disclosure.

CLAIMABLE INVENTIONS

There will be described inventions recognized to be claimable in the present application.

(1) A vehicle-height adjusting system, comprising:

a plurality of vehicle-height adjusting actuators provided respectively for a plurality of wheels and each capable of adjusting a vehicle height for a corresponding one of the plurality of wheels;

a pressure medium supplier comprising a tank storing a pressure medium, the pressure medium supplier being capable of supplying the pressure medium from the tank to each of the plurality of vehicle-height adjusting actuators; and a vehicle height adjuster configured to adjust the vehicle height for each of the plurality of wheels by controlling the pressure medium supplier to control an amount of the pressure medium to be supplied to each of the plurality of vehicle-height adjusting actuators.

The pressure medium may be fluid including: gas such as air; and liquid such as working liquid, for example.

(2) The vehicle-height adjusting system according to the above form (1), wherein the vehicle height adjuster comprises a supply amount controller configured to control an amount of the pressure medium supplied from the tank to each of the plurality of vehicle-height adjusting actuators, by controlling an amount of reduction in a tank pressure that is a pressure of the pressure medium stored in the tank.

In the vehicle-height adjusting actuator, a relationship is established between an amount of increase in the vehicle height and the supply amount of the pressure medium. Thus, this relationship and a target value of the vehicle-height increase amount may be used to obtain an amount of the pressure medium to be supplied for achieving the target value of the vehicle-height increase amount. In the tank, a relationship is established between an amount of reduction in the tank pressure and an amount of the pressure medium supplied to the vehicle-height adjusting actuator (i.e., an amount of the pressure medium discharged from the tank). Thus, the amount of reduction in the tank pressure may be used to obtain the amount of the discharged pressure medium (the amount of the pressure medium supplied to the vehicle-height adjusting actuator). In view of the above, the amount of increase in the vehicle height is determined based on the amount of reduction in the tank pressure, and it is possible to control the amount of increase in the vehicle height by controlling the amount of reduction in the tank pressure. This configuration enables the vehicle height to be adjusted without determining whether an actual vehicle height or an amount of change in an actual vehicle height is brought closer to a target vehicle height or a target vehicle-height change amount.

(3) The vehicle-height adjusting system according to the above form (2), wherein the supply amount controller is configured to control the amount of the pressure medium to be supplied to each of the plurality of vehicle-height adjusting actuators, further based on at least one of the temperature in the vehicle-height adjusting system and a load acting on each of the plurality of wheels.

It is possible to consider that the temperature in the vehicle-height adjusting system as an internal temperature is substantially equal to the temperature of the pressure medium stored in the tank. A change in the temperature of the pressure medium changes a relationship between the tank pressure and the amount of the pressure medium. The tank pressure with respect to the amount of the pressure medium is higher in the case where the temperature is high than in the case where the temperature is low. Also, the load applied to the wheel corresponds to a pressure of the pressure medium in the vehicle-height adjusting actuator. A change in a load, i.e., the pressure of the pressure medium in the vehicle-height adjusting actuator changes a relationship between the vehicle-height increase amount and the amount of the pressure medium in the vehicle-height adjusting actuator. The vehicle-height increase amount with respect to the amount of the pressure medium is smaller in the case where the load is large than in the case where the load is small. In view of the above, consideration of at least one of the internal temperature and the load enables more accurate obtainment of a relationship between the amount of reduction in the tank pressure and the vehicle-height increase amount.

(4) The vehicle-height adjusting system according to any one of the above forms (1) through (3), wherein the plurality of vehicle-height adjusting actuators comprise:
 a left vehicle-height adjusting actuator, as one of the plurality of vehicle-height adjusting actuators, capable of adjusting the vehicle height for at least one left wheel of the vehicle on at least one of a front-wheel side and a rear-wheel side; and
 a right vehicle-height adjusting actuator, as one of the plurality of vehicle-height adjusting actuators, capable of adjusting the vehicle height for at least one right wheel of the vehicle on the at least one of the front-wheel side and the rear-wheel side, and
 wherein the vehicle height adjuster comprises a right-and-left identical amount controller configured to control the pressure medium supplier such that a substantially identical amount of the pressure medium is to be supplied from the tank to the left vehicle-height adjusting actuator and the right vehicle-height adjusting actuator, when at least one of the plurality of wheels is in contact with an uneven road surface.

Substantially the same amount of the pressure medium may be supplied to the vehicle-height adjusting actuators for the right and left wheels on each of the front-wheel side and the rear-wheel side. With this operation, the vehicle heights for the respective right and left wheels on each of the front-wheel side and the rear-wheel side are increased by the substantially same amount. As a result, it is possible to reduce an inclination of a body of the vehicle in the right and left direction in the case where a road on which the vehicle travels is changed from an uneven road to an even road. It is noted that the size and other parameters of the vehicle-height adjusting actuators are usually different between the front-wheel side and the rear-wheel side. Thus, the supply amounts of the pressure medium for achieving the same vehicle-height increase amount are different from each other in most cases.

(5) The vehicle-height adjusting system according to the above form (4), wherein the vehicle height adjuster comprises an individual controller configured to control the pressure medium supplier such that a substantially identical amount of the pressure medium is to be supplied from the tank to the left vehicle-height adjusting actuator and the right vehicle-height adjusting actuator, individually.

In the case where the plurality of vehicle-height adjusting actuators are connected to the pressure medium supplier respectively via individual vehicle-height adjusting valves, the vehicle-height adjusting valve corresponding to the vehicle-height adjusting actuator provided for a control target wheel is opened, and all the vehicle-height adjusting valves corresponding to the respective vehicle-height adjusting actuators other than the vehicle-height adjusting actuator provided for the control target wheel are closed. As a result, the pressure medium stored in the tank is supplied only to the vehicle-height adjusting actuator corresponding to the opened vehicle-height adjusting valve, and it is possible to accurately obtain the amount of the pressure medium supplied from the tank to the vehicle-height adjusting actuator.

(6) The vehicle-height adjusting system according to the above form (4) or (5), wherein the vehicle height adjuster is configured to control the pressure medium supplier such that a substantially identical amount of the pressure medium is to be supplied from the tank to the left vehicle-height adjusting actuator and the right vehicle-height adjusting actuator, even when any one of vehicle heights respectively for the left wheel and the right wheel is greater than a reference vehicle height, and the other of the vehicle heights is less than the reference vehicle height.

The normal vehicle height or the target vehicle height may be used as the reference vehicle height, for example. On the even road, it is usual to increase the vehicle height for the wheel which is less than the reference vehicle height and reduce the vehicle height for the wheel which is greater than the reference vehicle height. On the uneven road, however, the vehicle heights for all the wheels are increased by the same amount. These operations allow the vehicle to pass through the uneven road well and reduce the inclination of the vehicle body in the right and left direction on the even road.

(7) A vehicle-height adjusting system, comprising:
 a vehicle-height adjusting actuator capable of adjusting a vehicle height for a wheel;
 a pressure-medium supplying and discharging device comprising a tank storing a pressure medium, the pressure-medium supplying and discharging device being configured to supply the pressure medium from the tank to the vehicle-height adjusting actuator and configured to discharge the pressure medium from the vehicle-height adjusting actuator and supply the pressure medium to the tank; and
 a vehicle height adjuster configured to adjust the vehicle height by controlling the pressure-medium supplying and discharging device,
 wherein the vehicle height adjuster comprises a tank-pressure-dependent vehicle height adjuster configured to adjust the vehicle height by controlling an amount of change in the pressure medium in the vehicle-height adjusting actuator based on an amount of change in a tank pressure that is a pressure of the pressure medium stored in the tank.

The object of the present disclosure is to well adjust the vehicle heights based on an amount of change in the tank pressure. In the vehicle-height adjusting system, the vehicle heights are adjusted based on a relationship among the tank pressure, the amount of supply/discharge of the pressure medium, and the vehicle-height change amount. This configuration allows the vehicle heights to be adjusted based on the tank pressure. It is noted that the vehicle-height adjusting system according to this form may incorporate the technical features according to any one of the above forms (1) through (6).

What is claimed is:

1. A vehicle-height adjusting system, comprising:
a plurality of vehicle-height adjusting actuators provided respectively for a plurality of wheels of a vehicle and each being capable of adjusting a vehicle height for a corresponding one of the plurality of wheels, the plurality of vehicle-height adjusting actuators including:
   a left vehicle-height adjusting actuator, as one of the plurality of vehicle-height adjusting actuators, capable of adjusting the vehicle height for at least one left wheel of the vehicle on at least one of a front-wheel side and a rear-wheel side, and
   a right vehicle-height adjusting actuator, as one of the plurality of vehicle-height adjusting actuators, capable of adjusting the vehicle height for at least one right wheel of the vehicle on the at least one of the front-wheel side and the rear-wheel side;
a pressure medium supplier including a tank storing a pressure medium, the pressure medium supplier being capable of supplying the pressure medium from the tank to each of the plurality of vehicle-height adjusting actuators; and
a vehicle height adjuster configured to adjust the vehicle height for each of the plurality of wheels by controlling the pressure medium supplier to control an amount of the pressure medium to be supplied to each of the plurality of vehicle-height adjusting actuators, the vehicle height adjuster including:
   an uneven-road-surface determiner configured to determine whether one of the plurality of wheels is in contact with an uneven road surface, and
   a supply amount controller configured to control the pressure medium supplier such that an amount of the pressure medium to be supplied from the tank to the left vehicle-height adjusting actuator is substantially equal to an amount of the pressure medium to be supplied from the tank to the right vehicle-height adjusting actuator, when the uneven-road-surface determiner determines that the one of the plurality of wheels is in contact with the uneven road surface.

2. The vehicle-height adjusting system according to claim 1, wherein the supply amount controller is further configured to:
control the pressure medium supplier such that a substantially identical amount of the pressure medium is to be supplied from the tank to the left vehicle-height adjusting actuator and the right vehicle-height adjusting actuator, individually.

3. The vehicle-height adjusting system according to claim 1, wherein the supply amount controller is further configured to:
control an amount of the pressure medium supplied from the tank to each of the plurality of vehicle-height adjusting actuators, by controlling an amount of reduction in a tank pressure that is a pressure of the pressure medium stored in the tank.

4. The vehicle-height adjusting system according to claim 3, wherein
the uneven-road-surface determiner comprises a warp-amount obtainer configured to obtain a warp amount, and the warp amount is an absolute value of a difference between a sum of vehicle heights respectively for a front right wheel and a rear left wheel, and a sum of vehicle heights respectively for a front left wheel and a rear right wheel, and
the supply amount controller includes a tank-pressure-reduction-amount determiner configured to determine a target vehicle-height increase amount based on the warp amount obtained by the warp-amount obtainer, and to determine a tank-pressure reduction amount based on the target vehicle-height increase amount.

5. The vehicle-height adjusting system according to claim 1, wherein
the uneven-road-surface determiner determines that one of the plurality of wheels is in contact with an uneven road surface when a warp amount is larger than a threshold value, and
the warp amount is an absolute value of a difference between a sum of vehicle heights respectively for a front right wheel and a rear left wheel, and a sum of vehicle heights respectively for a front left wheel and a rear right wheel.

6. The vehicle-height adjusting system according to claim 1, wherein the supply amount controller is configured to control the amount of the pressure medium to be supplied to each of the plurality of vehicle-height adjusting actuators, based on at least one of a temperature in the vehicle-height adjusting system and a load acting on each of the plurality of wheels.

7. A vehicle-height adjusting system, comprising:
a vehicle-height adjusting actuator capable of adjusting a vehicle height for a wheel;
a pressure-medium supplying and discharging device including a tank storing a pressure medium, the pressure-medium supplying and discharging device being configured to supply the pressure medium from the tank to the vehicle-height adjusting actuator and configured to discharge the pressure medium from the vehicle-height adjusting actuator and supply the pressure medium to the tank; and
a vehicle height adjuster configured to adjust the vehicle height by controlling the pressure-medium supplying and discharging device, the vehicle height adjuster including:
   an uneven-road-surface determiner configured to determine whether one of a plurality of wheels is in contact with an uneven road surface; and
   a tank-pressure-dependent vehicle height adjuster configured to adjust the vehicle height by controlling an amount of change in a tank pressure to control an amount of change in the pressure medium in the vehicle-height adjusting actuator when the uneven-road-surface determiner determines that the one of the plurality of wheels is in contact with the uneven road surface, wherein the tank pressure is a pressure of the pressure medium stored in the tank.

* * * * *